(12) United States Patent
Sundaram et al.

(10) Patent No.: US 6,369,900 B1
(45) Date of Patent: Apr. 9, 2002

(54) GLIDE HEAD WITH FEATURES ON ITS AIR BEARING SURFACE FOR IMPROVED FLY HEIGHT MEASUREMENT

(75) Inventors: Ramesh Sundaram; Wei H. Yao, both of Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/211,217

(22) Filed: Dec. 14, 1998

Related U.S. Application Data

(60) Provisional application No. 60/082,229, filed on Apr. 16, 1998.

(51) Int. Cl.$^7$ ................................................. G01B 11/14
(52) U.S. Cl. .......................... 356/614; 356/507; 73/105
(58) Field of Search ................................. 356/507, 614, 356/622; 369/53.38; 29/603.12, 603.17, 559; 360/31, 235.6, 236, 236.1, 236.2, 236.8, 103; 73/105, 660

(56) References Cited

U.S. PATENT DOCUMENTS

| | | | | |
|---|---|---|---|---|
| 4,564,585 A | * | 1/1986 | Blaske et al. ................ 430/313 |
| 4,581,529 A | | 4/1986 | Gordon ....................... 250/277 |
| 4,866,553 A | * | 9/1989 | Kubo et al. .................. 360/103 |
| 5,004,307 A | | 4/1991 | Kino et al. ................... 350/1.2 |
| 5,034,828 A | | 7/1991 | Ananth et al. ................ 360/75 |
| 5,052,099 A | | 10/1991 | Taguchi et al. ............... 29/603 |
| 5,067,037 A | | 11/1991 | Ananth et al. ................ 360/103 |
| 5,086,360 A | * | 2/1992 | Smith et al. .................. 360/103 |
| 5,096,277 A | | 3/1992 | Kleinerman .................. 385/12 |
| 5,125,750 A | | 6/1992 | Corle et al. ................... 359/819 |
| 5,193,132 A | | 3/1993 | Uken et al. ................... 385/32 |
| 5,212,379 A | | 5/1993 | Nafarrate et al. ........... 250/227.14 |
| 5,280,340 A | | 1/1994 | Lacey ......................... 356/357 |
| 5,286,971 A | | 2/1994 | Betzig et al. .............. 250/227.26 |
| 5,345,353 A | | 9/1994 | Krantz et al. ................ 360/103 |
| 5,363,463 A | | 11/1994 | Kleinerman ................. 385/123 |
| 5,388,325 A | * | 2/1995 | Matsuzawa et al. .......... 29/603 |
| 5,457,534 A | | 10/1995 | Lacey et al. ................. 356/357 |
| 5,481,791 A | * | 1/1996 | Matsubara et al. ........... 29/603 |
| 5,486,924 A | | 1/1996 | Lacey ......................... 356/357 |
| 5,497,359 A | | 3/1996 | Mamin et al. ............ 369/44.15 |
| 5,508,861 A | | 4/1996 | Ananth et al. ............... 360/103 |
| 5,526,204 A | | 6/1996 | French et al. ............. 360/97.02 |
| 5,537,385 A | | 7/1996 | Alon et al. ................... 369/119 |
| 5,550,693 A | | 8/1996 | Hendriks et al. ............ 360/103 |
| 5,566,159 A | | 10/1996 | Shapira ....................... 369/99 |
| 5,598,393 A | | 1/1997 | Alon et al. ................... 369/102 |
| 5,625,512 A | | 4/1997 | Smith .......................... 360/103 |
| 5,680,213 A | * | 10/1997 | Hunsaker et al. ............ 356/357 |
| 5,805,284 A | * | 9/1998 | Lacey ......................... 356/357 |
| 5,970,603 A | * | 10/1999 | Quintana et al. ......... 29/603.12 |
| 6,003,364 A | * | 12/1999 | Yao et al. ..................... 73/105 |

FOREIGN PATENT DOCUMENTS

| | | |
|---|---|---|
| JP | 59-193580 A | 11/1994 |
| JP | 8-279132 A | 10/1996 |
| JP | 8-287440 A | 11/1996 |

\* cited by examiner

Primary Examiner—Hoa Q. Pham
(74) Attorney, Agent, or Firm—Westman, Champlin & Kelly, P.A.

(57) ABSTRACT

An improved glide head has optical marks on the air bearing surface. The glide heads can be used for detecting defects on disc surfaces following an evaluation of the fly height as a function of disc rotation. The optical marks provide a position for focusing light used in the optical measurement of fly height. The optical marks have measurably different optical properties from the portions of the air bearing surface not covered by an optical mark. The differences in optical properties of the optical marks can be used to adjust the position of the optical system relative to the glide head to ensure that the light is focused on an optical mark.

20 Claims, 1 Drawing Sheet

GLIDE HEAD WITH FEATURES ON ITS AIR BEARING SURFACE FOR IMPROVED FLY HEIGHT MEASUREMENT

CROSS REFERENCE TO RELATED APPLICATIONS

This application claims priority to U.S. Provisional Pat. App. Ser. No. 60/082,229, entitled "An Improved Glide Head," filed on Apr. 16, 1998.

BACKGROUND OF THE INVENTION

The invention relates to glide heads for evaluating glide quality of a disc surface, and to related methods. In particular, the invention relates to glide heads with modified air bearing surfaces for improved optical fly height measurements.

Disc drives are used for storing information, typically as magnetically encoded data, and more recently as optically encoded data, on a disc surface. In general, in optical storage systems, data is in the form of marks carried on the surface of the disc which are detected using the reflected laser light. There are a number of different optical disc technologies which are known in the industry.

To read from and/or write to a magnetic or optical disc, a transducing head is positioned over a surface of the disc while the disc rotates at high speed. The head takes the form of a slider which is designed to "fly" just over the surface of the rotating disc.

Increased storage density is becoming increasingly important. One technique known to increase storage density is to decrease the "fly height" of the head. Fly height of a read/write head is defined as the distance between the disc surface and the transducing element located at the trailing edge of the slider's air bearing surface. A reduced fly height allows information to be written or read more precisely and such information can be stored in a smaller area (i.e., at a higher density). Lower fly heights of read/write heads impose narrower restrictions on acceptable heights of asperities on a disc surface since higher defects would result in contact between the read/write head and the disc. Contact between a read/write head and a disc generally results in damage to the head and/or to the disc.

To ensure reliability, glide tests are used to evaluate the defect distribution on a surface of a disc. In particular, glide tests are used by computer disc manufacturers to control and assure the quality of the disc media. Generally, all hard drive discs are tested before shipment. During a glide test, the glide head or slider flies over a disc surface generally at a predetermined clearance from the disc surface, known as the glide height or fly height. The glide height or fly height of a glide head/slider is the distance between the disc surface and a close point on the glide head air bearing surface. If contact occurs between the glide head and a disc defect or asperity, the slider vibrates and deforms. Interactions between the glide head and the disc can be measured with a transducer, such as a piezoelectric transducer or a thermal transducer.

The glide heads are selectively moved under the control of electronic circuitry to any one of a plurality of circular, concentric data tracks on the disc surface by an actuator device. Each slider body includes an air bearing surface (ABS). As the disc rotates, the disc drags air beneath the ABS, which develops a lifting force that causes the glide head to lift and fly above the disc surface. Glide heads generally are designed to have a fly height that is sensitive to the linear velocity of the disc surface relative to the glide head. For example, to detect smaller defects on a disc surface, the disc velocity can be decreased to decrease the fly height of the glide head.

The glide/fly height used in a glide test generally is substantially lower than the fly height of the read/write head to be used with the disc to account for variability in the fly height of a given read/write head given production variability and differences in operating conditions of the disc drive during use. Also, there is variability in the glide height of a specific glide head due to production variability.

Various techniques have been used in the art to measure the fly height of a glide head. One technique to measure fly height is by measuring electrical capacitance between the head and the disc. Another common technique to measure fly height is using optical methods such as interferometry in which a transparent test disc is used to fly the glide head. Light is shined through the disc onto the glide head from a source on the other side of the disc. Using known techniques, the reflected light can be examined to determine fly height.

Glide heads generally have been made from aluminum oxide-titanium carbide AlTiC composite ceramic. AlTiC is a two phase material with discrete grain boundaries between particles of the two materials. While AlTiC is a convenient material, the material can introduce errors during optical fly height measurements. In particular, interferometry with the head and a transparent disc is often used to measure fly height. When optical properties are not uniform across the head, the optical measurement may depend on the optical properties of the material at the optical focal point on the glide head. The lack of uniformity leads to errors in fly height measurement.

SUMMARY OF THE INVENTION

In a first aspect, the invention pertains to a glide head including an air bearing surface and an optical mark on the air bearing surface. The optical mark has different optical properties from the portions of the air bearing surface not covered with an optical mark. The glide head can be part of an asperity detection apparatus, where the glide head further includes a suitable transducer.

In another aspect, the invention pertains to a method of evaluating fly height, the method including focusing light onto an optical mark on an air bearing surface of a glide head. The optical mark has different optical properties from the portions of the air bearing surface not covered with an optical mark.

DETAILED DESCRIPTION OF THE PREFERRED EMBODIMENTS

Reflective structures on the air bearing surface of a glide head are used to improve the accuracy of optical fly height measurements of the glide head relative to a spinning disc. The reflective structures or optical marks provide a surface with uniform optical properties for interferometry measurements of fly height on which to focus an optical beam used in the measurement. The optical marks have identifiably different optical properties from the adjacent substrate. The placement of the optical marks on the air bearing surface provide well defined optical targets for the fly height measurements. The measurement point is significant since the "fly height" varies from one point of the air bearing surface to another due to pitch and roll of the glide head relative to a spinning disc. Thus, an optical mark provides a uniform reflective surface and a specific position on the glide head for the fly height measurement. Both of these features of the optical mark lead to improved accuracy and uniformity of a fly height measurement.

Figure 1:
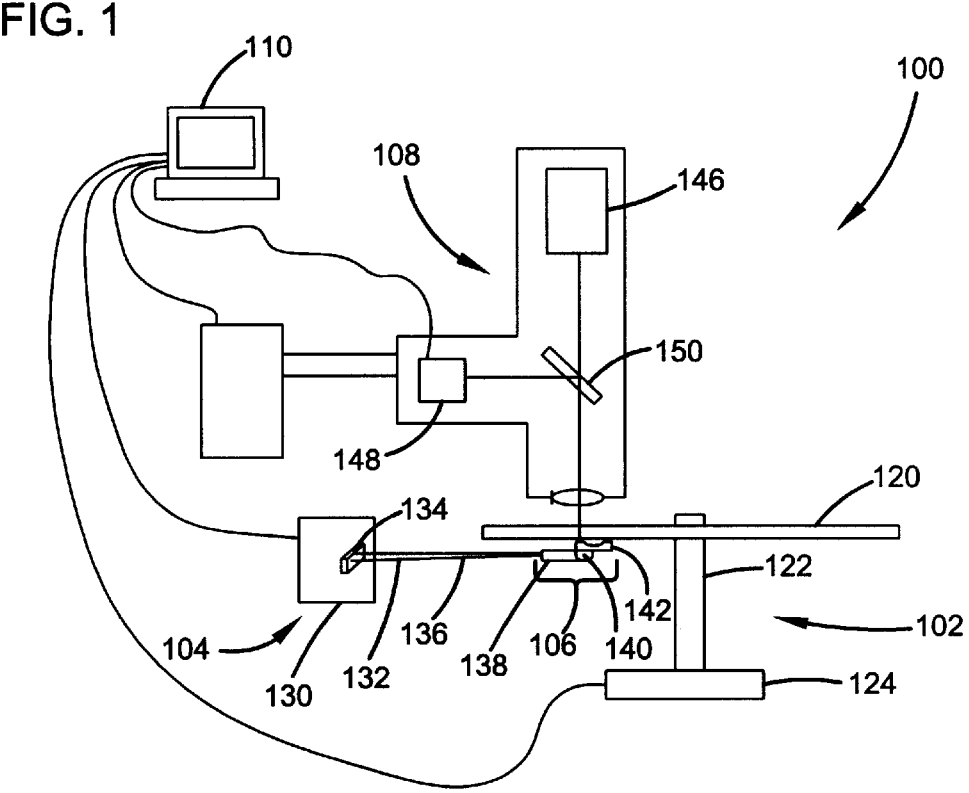
FIG. 1 is a schematic, sectional view of a fly height measurement system with an improved glide head.

Referring to FIG. 1, a fly height measurement system 100 includes a disc drive system 102, an arm assembly drive 104, a suspension/glide head assembly 106, an optical system 108 and a control system 110. Fly height measurement system 100 generally is part of a stand alone system used for fly height measurement with a selected slider. Thus, fly height measurement system 100 can be used to evaluate fly height of the particular slider as a function of the relative velocity of the disc and the glide head. Once the fly height properties are evaluated for a glide head, the glide head can be used in a defect detection system to measure defects on a disc surface.

Disc drive system 102 includes a disc 120, spindle 122 and a spindle motor 124. Spindle motor 124 can spin disc 120 generally at high RPM. Disc 120 is at least partly transparent and may have pits, grooves, coatings, layers and the like that alter the transmitting and reflecting properties of the disc.

Arm assembly drive 104 has a motorized drive 130 and an arm 132. Arm 132 has a support portion 134 that connects with motorized drive 130 and an extension portion 136 that extends near disc 120 mounted on spindle motor 124. Motorized drive 130 moves arm 132 by lateral motion and/or by rotational motion to alter the position of suspension/glide head assembly 106 along disc 120.

Suspension/glide head assembly 106 is supported at or near the end of extension portion 136. Suspension/glide head assembly 106 generally includes suspension 138, gimbal 140 and glide head 142. Suspension 138 connects with arm 132. Glide head 142 is connected to suspension 138 by way of gimbal 140. Suspension 138 and gimbal 140 can have a variety of designs including conventional structures.

Glide head 142 generally includes transducers for the detection of asperities or other imperfections on a disc surface. While particular details of the glide head such as location and type of transducers or optical components may depend on selected design parameters, all relevant glide heads have certain features in common. In particular, the relevant glide heads have air bearing surfaces for flying very close to the surface of a disc.

Optical system 108 is used to measure the distance between disc 120 and the surface of glide head 142. With the disc spinning at a high number of RPM, glide head 142 flies at a very close distance to the surface of disc 120. Glide head 142 rides over air that flows between glide head 142 and disc 120. The surface of glide head 142 riding near the disc surface is referred to as the air bearing surface. Accurate information on the fly height can be used to verify proper operation of the disc drive system.

A variety of optical system designs can be used to measure the fly height based on light transmitting through the disc, striking the glide head surface and reflecting back. Regardless of the particular optical system design, optical system 108 includes a light source 146, a detector 148 and an optical element or elements 150.

The characteristics of light source 146, detector 148 and optical element(s) 150 depend on the particular type of measurements being made. For example, light source 146 can be monochromatic where the detector is designed to measure interference fringes. Alternatively, light source 146 can be polychromatic such as a dual wavelength source or a white light source where the detector is based on white light interferometry. A variety of approaches for measuring these distances are described in U.S. Pat. No. 5,457,534 to Lacey et al., entitled "Method and Apparatus to Calibrate Intensity and Determine Fringe Order for Interferometer Measurement of Small Spacings," incorporated herein by reference. The optical components can be positioned based on a variety of design considerations or design preferences, and additional optical components can be used, as desired or needed for a particular design. Glide heads modified as described herein can be used with any optically based fly height measurement system based on light reflected from the glide head surface.

The focal point of the light onto the glide head can be adjusted by motion of arm 132 and/or motion of the optical elements. Control system 110 can include a standard microprocessor or a specifically designed processor for use with fly height measurement system 100. Control system 110 generally receives output from detector 148. Detector output can be used for fly height evaluation and/or for maintenance of the alignment between optical system 108 and glide head 142. The evaluation of fly height depends on the specific design features of optical system 108 such as the type of detector and light source, and standard approaches can be used.

Figure 2:
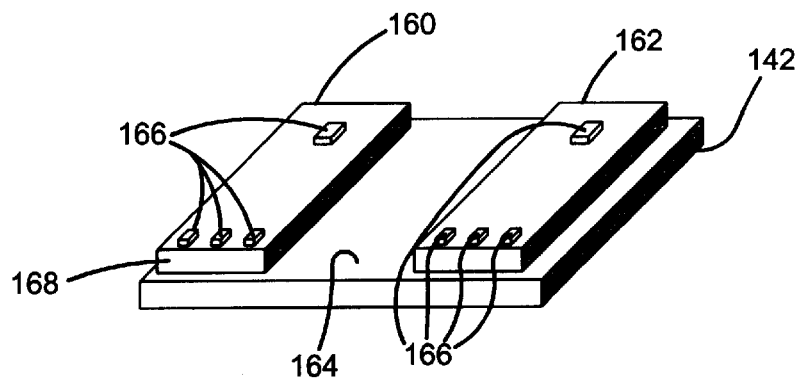
FIG. 2 is a perspective view of an air bearing surface of a glide head with optical marks.

Referring to FIG. 2, to influence the aerodynamic properties of glide head 142, glide head 142 generally has contours such as outer rail 160 and inner rail 162 forming a projecting portion of air bearing surface 164. Rails 160, 162 or other raised portions generally present the part of glide head 142 that approaches closest to disc 120. One or more optical marks 166 are included on air bearing surface 164, preferably on a projecting contour such as outer rail 160 and inner rail 162.

Due to pitch and roll of glide head 142 while flying near spinning disc 120, rear edge 168 of outer rail 160 generally is at or near the point of closest approach of glide head 142 to disc 120. Thus, one preferred location for the placement of optical mark(s) 166 is the surface of outer rail 160 at or near rear edge 168. A plurality of optical marks 166 can be used such that the fly height can be measured relative to different points on air bearing surface 164 of glide head 142. If a plurality of optical marks are used, they may or may not be made of the same material.

Optical marks 166 preferably are made from an opaque material and preferably have relatively high reflectivity. Suitable materials for the formation of optical marks include metals and metal compounds. Preferred materials include, for example, chrome, which adheres well to suitable substrates. The pad material preferably is homogenous such that reflection from the pad is uniform regardless of the portion of the pad in focus.

Generally, optical marks 166 can be as thin as possible while still having uniform reflectivity across most of its surface. In particular, if the optical marks are placed on an AlTiC substrate, the grains of the substrate AlTiC should not influence the optical properties of optical marks 166. With metal used for forming optical marks 166, the metal preferably has a thickness of about 10 nm or less, and generally the thickness ranges from 1 nm to about 10 nm. Larger thicknesses can be used if the metal is placed within a hole in the air bearing surface such as along a rail.

Preferably, optical marks 166 should be relatively small relative to the size of air bearing surface 164 but larger than the focal point of the light on air bearing surface 164. In alternative embodiments, however, metal is placed over the entire air bearing surface. Optical marks 166 can have a variety of cross sectional shapes such as square, rectangular or elliptical. Optical marks 166 generally have a cross sectional area of about 1000 $\mu m^2$ or more, and preferably from about 1000 $\mu m^2$ to about 12,000 $\mu m^2$.

Optical marks 166 can be made by a variety of thin film techniques. Suitable deposition techniques include, for example, ion beam deposition, vapor deposition and sputtering. Generally, optical marks 166 are placed on glide head 142 after air bearing surface 164 is contoured. Generally, contouring generally is performed by vacuum techniques, such as ion milling or the like, which can be used along with photolithography for selective removal of material. In alternative embodiments, optical marks 166 are placed within an indentation in the substrate such that optical mark 166 is located in a recess.

The slider body and contours on air bearing surface 164 preferably both have detectably different optical properties from optical marks 166. The body of glide head 142 generally is made from AlTiC, which is a composite ceramic containing crystals of aluminum oxide and titanium carbide. The entire air bearing surface 164 can be covered with a layer of diamond-like carbon (DLC) or other hard material to protect the surface. If the protective coating, such as DLC, is placed over the air bearing surface after the deposition of the optical mark(s), the protective coating prevents smearing of optical marks 166 during use. The optical properties can be changed by the protective coating. Alternatively, optical mark(s) 166 can be applied after the DLC or other protective coating. Once the fly height measurements are made, optical mark(s) 166 are no longer needed. Thus, no difficulties arise if optical mark(s) 166 smear or are removed during subsequent disc defect measurements.

Furthermore, optical mark(s) 166 can be placed along an edge of glide head 142, preferably rear edge 168, using a variety of processes suitable for the placement of structures along an edge of a slider/glide head. For the embodiments along an edge of glide head 142, optical mark 166 can have a thickness perpendicular to air bearing surface 164 as large as the thickness of glide head 142.

When measuring reflected light from the glide head surface, reflectivity differences between optical mark(s) 166 and other features on air bearing surface 164 result in detectable differences in the signal measured by detector 148 depending on the point at which the light is focused. In other words, the signal measured by the detector 148 can be used to evaluate whether or not the light is focused on an optical mark 166 or on another portion of the glide head 142. The qualitative differences can be monitored by control system 110. Thus, if air bearing surface 164 has a single optical mark 166, motor drive 130 or other adjustments within optical system 108 can be used to position the light beam onto the single optical mark 166. If glide head 142 is moved relative to the surface of disc 120, control system 110 can verify from the output of detector 148 if the focus point is on optical mark 166. Control system 110 can use a feed back loop to maintain focus onto optical mark 166 if focus begins to drift.

When air bearing surface 164 has multiple optical marks 166, the focal point on glide head 142 can be moved to scan between different optical marks 166 either to verify that a selected optical mark is indeed the focus point or to move to a different point on glide head 142 for the performance of fly height measurements. By making measurements at different points along air bearing surface 164, information can be obtained about the pitch and roll of glide head 142 relative to disc 120. If anomalous values of pitch and roll are obtained, this could be indicative of significant surface imperfections on glide head 142 or other problems.

Although the present invention has been described with reference to preferred embodiments, workers skilled in the art will recognize that changes may be made in form and detail without departing from the spirit and scope of the invention.

What is claimed is:

1. A glide head comprising:

a slider body including a leading edge, a trailing edge and opposed side edges, and the slider body including an air bearing surface; and a reflecting means on said air bearing for measuring operating parameters of the glide head relative to a disc surface.

2. A glide head comprising:

a glide body having a leading edge, a trailing edge and opposed side edges and the glide body including an air bearing surface having a raised surface portion and a recessed surface portion; and an optical mark on the air bearing surface having a distinguishable reflective surface from the air bearing surface.

3. The glide head of claim 2 wherein the optical mark is opaque.

4. The glide head of claim 2 wherein the optical mark comprises elemental metal.

5. The glide head of claim 2 wherein the optical mark has a thickness of about 10 nm or less.

6. The glide head of claim 2 wherein the optical mark covers an area of the air bearing surface of about 100 $\mu m^2$ or more.

7. The glide head of claim 2 wherein the optical mark covers an area from about 100 $\mu m^2$ to about 12,000 $\mu m^2$.

8. The glide head of claim 2 wherein the air bearing surface is covered with diamond-like carbon and wherein the optical mark is located on the surface of the diamond-like carbon.

9. The glide head of claim 2 comprising a plurality of optical marks having distinguishable optical properties from the air bearing surface.

10. An asperity detection apparatus comprising a glide head of claim 2 and a transducer for evaluating whether the glide head has interacted with a surface defect on a disc surface.

11. The asperity detection apparatus of claim 10 wherein the transducer is a piezoelectric transducer.

12. The asperity detection apparatus of claim 10 wherein the transducer is a thermal transducer.

13. A method of evaluating fly height, the method comprising:

supporting a glide head relative to a disc surface;

focusing light onto an optical mark on an air bearing surface of the supported glide head, the optical mark having distinguishable optical properties from the air bearing surface;

detecting the optical mark to measure a position of the glide head relative to the disc surface.

14. The method of claim 13 wherein the properties of light reflected from the glide head are monitored to evaluate whether the light is focused on the optical mark.

15. The method of claim 14 wherein the optical mark comprises elemental metal.

16. The method of claim 13 wherein the optical mark is opaque.

17. The method of claim 13 wherein the glide head comprises a plurality of optical marks.

18. The method of claim 17 and further comprising performing optical measurements at the plurality of optical marks.

19. The method of claim 18 wherein the optical measurements are used to measure a plurality of fly heights at the plurality of optical marks and the plurality of fly height measurements are used to evaluate pitch and roll of the glide head relative to the disc surface.

20. The method of claim 18 wherein the optical measurements at the plurality of optical marks are used to select a particular optical mark for a fly height measurement.

* * * * *